United States Patent [19]

Suzuki et al.

[11] 4,364,002
[45] Dec. 14, 1982

[54] CONTROL OF OPERATION OF LOOM

[75] Inventors: Hajime Suzuki, Anjyo; Akio Arakawa, Kariya, both of Japan

[73] Assignee: Kabushiki Kaisha Toyoda Jidoshokki Seisakusho, Aichi, Japan

[21] Appl. No.: 107,621

[22] Filed: Dec. 27, 1979

[30] Foreign Application Priority Data

Dec. 30, 1978 [JP] Japan .............................. 53-163447

[51] Int. Cl.$^3$ ..................... D03D 51/44; G05B 19/26
[52] U.S. Cl. ................................. 318/467; 318/614; 318/603; 364/470; 139/1 R; 139/336
[58] Field of Search ............... 139/1 R, 336 R, 370.2; 318/467, 640, 480, 653, 612–614, 7, 603; 364/469, 470

[56] References Cited

U.S. PATENT DOCUMENTS

| 3,757,831 | 9/1973 | Loepfe et al. | 139/336 |
| 3,761,790 | 9/1973 | Daab | 318/467 |
| 4,031,924 | 6/1977 | Domig et al. | 139/341 X |
| 4,082,119 | 4/1978 | Washind | 139/370.2 |
| 4,228,828 | 10/1980 | Loepfe et al. | 139/370.2 |

FOREIGN PATENT DOCUMENTS

48-25034  7/1973  Japan .
51-36046  9/1976  Japan .

Primary Examiner—B. Dobeck
Attorney, Agent, or Firm—Wenderoth, Lind & Ponack

[57] ABSTRACT

A method and an apparatus for controlling operation of at least one operating element of a loom on the basis of a reference signal are disclosed. A rotational position signal developed during each weaving cycle of the loom is compared with the reference signal to issue a rotational angle signal indicating an angle through which the loom has been rotated with respect to a reference angular position. By utilizing this rotational angle signal, the timing of the operation of any operating element can be determined.

18 Claims, 14 Drawing Figures

CONTROL OF OPERATION OF LOOM

BACKGROUND OF THE INVENTION

This invention relates to a method and an apparatus for controlling the operation of weaving looms.

In the past, it has been proposed to produce a synchronization signal at a predetermined time during each weaving cycle of a loom by means of a suitable mechanical, electrical, or magnetic device in order to set the timing of the operation of the various operating elements of a loom on the basis of the synchronization signal. For example, mechanical and electrical systems to stop the loom at a predetermined angular position have been known.

The known mechanical system includes a cam, which makes one complete rotation during each one weaving cycle of the loom and is in operative contact with a lever. When a signal which requires an electric motor for driving a crank shaft of the loom to stop rotation, is applied to the device, the lever operates to bring a handle into a position, in which a clutch disposed between the motor and the crank shaft is disengaged and a brake is applied, thereby stopping operation of the loom. However, such a mechanical system can not be conveniently applied to a high speed loom, since not only is it of a relatively complex structure, but also its mechanical components would necessarily involve time delays in functioning.

Figure 10:
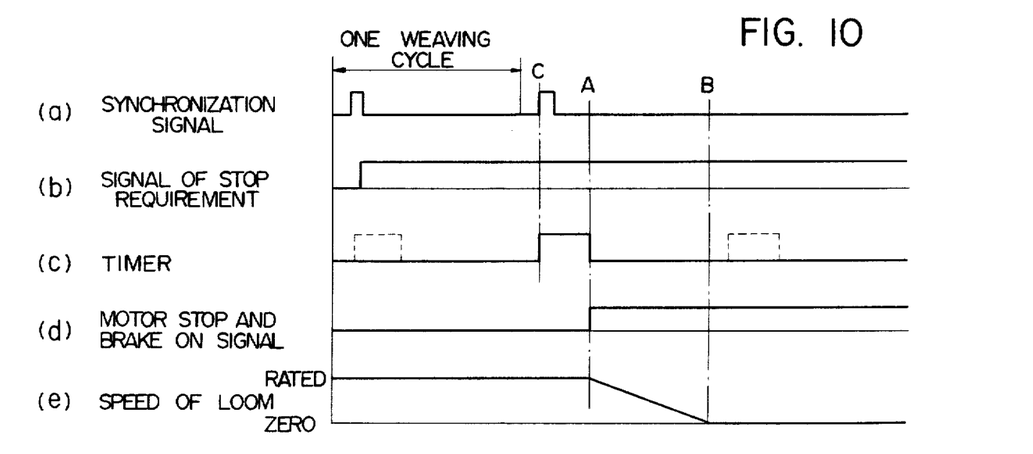
FIG. 10 is a view explaining operation of the prior art control system.

One example of the known electrical systems is illustrated in FIG. 10, from which it is understood that a synchronization signal is produced every weaving cycle of the loom as shown at waveform (a). Assuming that a breakage of a yarn, such as a warp yarn, weft yarn, or selvage yarn occurs, a yarn breakage detector develops a yarn breakage signal as shown at waveform (b), which requires the operation of the loom to stop. Thereafter, a timer is energized, as shown at waveform (c), at the same time as the development of the first synchronization signal after the stop requirement signal has been produced. After a predetermined period of time during which the timer is on, that is, at a time point A, a motor stop and brake on signal is produced as shown at waveform (d) and the brake is put on, thus causing the loom to stop its rotation at a time point B or a predetermined angular position. It is therefore understood that in such a known electrical system the time point A, at which the brake begins to operate, is determined by determining both the time point B and the brake stopping time (B−A), and the time period between the time point C at which the associated synchronization signal issues and the time point A is alloted to operation of the timer. Therefore, in the case where the stop requirement signal is developed during a time period which corresponds in length to the time difference (A−C) and during which the timer would be energized if the stop requirement signal issues prior to said time period, the timer can not be energized until the next synchronization signal issues. That is, during the weaving cycle during which the stop requirement signal is developed, the loom stopping operation does not commence, only after said weaving cycle. In that case, even if the brake is so designed as to provide an increased brake force enabling braking to be completed within one weaving cycle of the loom, the loom stopping operation would not be effected within the same weaving cycle as that during which the stop requirement signal is developed. Thus, it is understood that no matter how much the brake force is increased, the time necessary to stop the loom at the desired angular position after the occurrence of the stop requirement signal can not be decreased.

Furthermore, the afore-mentioned known electrical system exhibits a disadvantage when the loom is operated intermittently or continuously at low speed. That is, in those circumstances, since the rotation of the loom is slow and its speed is not constant, while the preset time of the timer is always constant, the loom can not be stopped at the desired angular position. Also furthermore, when it is necessary to stop the loom at different angular positions in accordance with the cause for the stop requirement, such as a warp yarn and a weft yarn breakage, the known electrical system must include synchronization signal generators corresponding in number to the number of the causes for the stopping of the loom.

Meanwhile, where the weft yarn detector is of a photoelectric type, a timing of operation thereof has to be preset in order to prevent mulfunction thereof, i.e., to prevent the detector from detecting something other than a weft yarn. Since the timing of operation of the weft yarn detector is generally different from those of other operating elements of the loom, an additional synchronization signal generator must be provided which comprises a combination of a rotary member rotatable in synchronization with the rotation of the loom and a weft yarn sensing unit of a photoelectric or magnetic type.

It is understood from the foregoing that since the device for presetting the timing of operation in the aforementioned known electrical system comprises the combination of the timer and the synchronization signal generator generating one synchronization pulse signal every weaving cycle of the loom, when it is desired to control operating elements of which timings of operation differ from each other, the known electric system must include a plurality of presetting devices corresponding in number to the operating elements. Also, the known electrical system necessarily involves a time delay, which is longer than at least the preset time of the timer, between the issuing of the stop requirement signal and commencement of the loom stopping operation.

SUMMARY OF THE INVENTION

It is therefore a principal object of this invention to provide a method and an apparatus for controlling operation of at least one operating element of a loom, which can remove the above-mentioned disadvantages of the prior art.

In brief, according to the invention, in addition to a reference signal, a signal representative of rotational positions of the loom is generated during each weaving cycle thereof. By comparing the rotational position signal with the reference signal, it is possible to produce a rotational angle position signal representative of an angle for or a rotational angle position to which the loom has been rotated with respect to a reference angle position, at which the reference signal is generally developed. A timing of operation of each operating element of the loom can be controlled dependent upon the rotational angle position signal.

BRIEF DESCRIPTION OF THE DRAWINGS

This invention will become more readily apparent from the following description of the preferred embodiments thereof shown, by way of example only, in the accompanying drawings, wherein.

DESCRIPTION OF THE PREFERRED EMBODIMENTS

In the present specification here described, the term "rotational position signal" is defined as a signal representative of a position of a rotating or oscillating member, for example a crank shaft or a reed, of a loom at any point of time during one weaving cycle of the loom, and the term "rotational angle signal" is defined as a signal representative of an angle through which the rotating or oscillating member has been rotated or oscillated with respect to a reference time point during one weaving cycle of the loom, and the term "timing angle signal" is defined as a signal indicating a time point at or a period of time during which an element to be controlled by a control system of the present invention should be brought into operation, said time point or period of time being converted to a rotational angle or angles of the loom.

Figure 1:
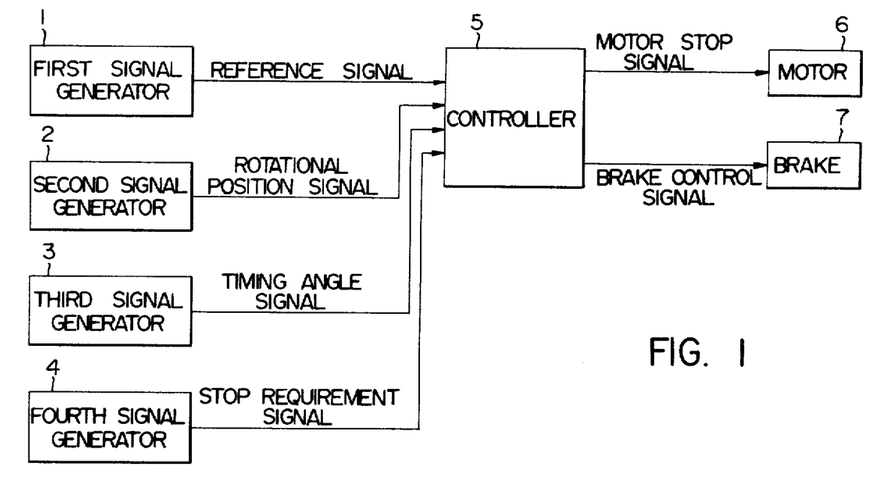
FIG. 1 is a block diagram illustrating the first embodiment of the invention.
Figure 5:
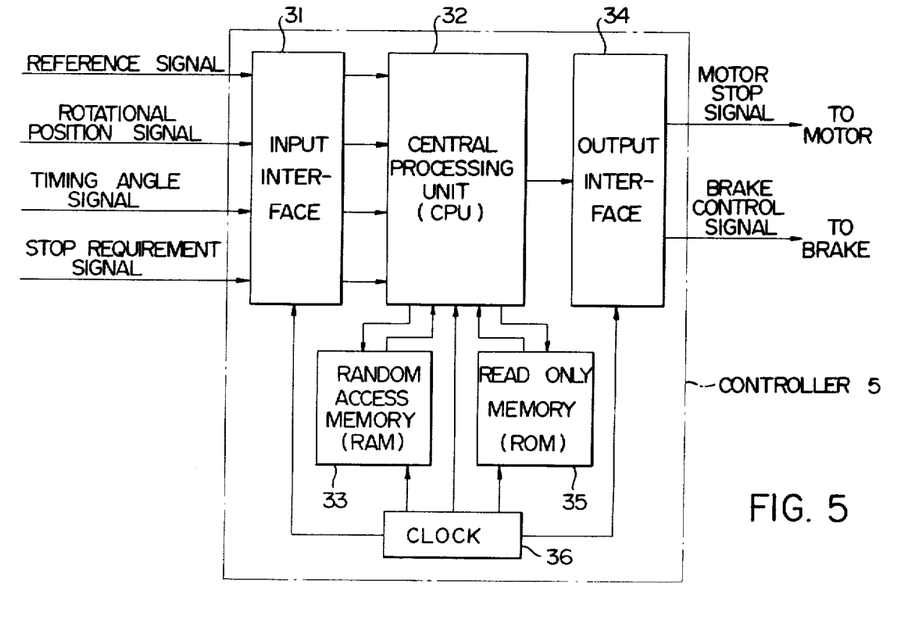
FIG. 5 is a block diagram showing a controller employed in the embodiment of FIG. 1.
Figure 6:
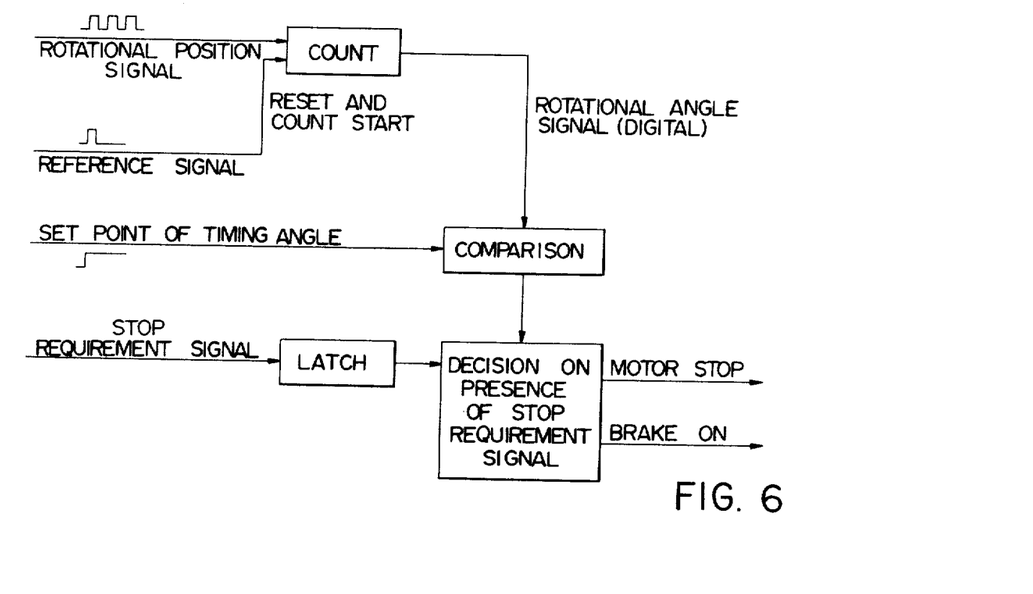
FIG. 6 is a block diagram explaining operation of the embodiment shown in FIG. 1.
Figure 7:
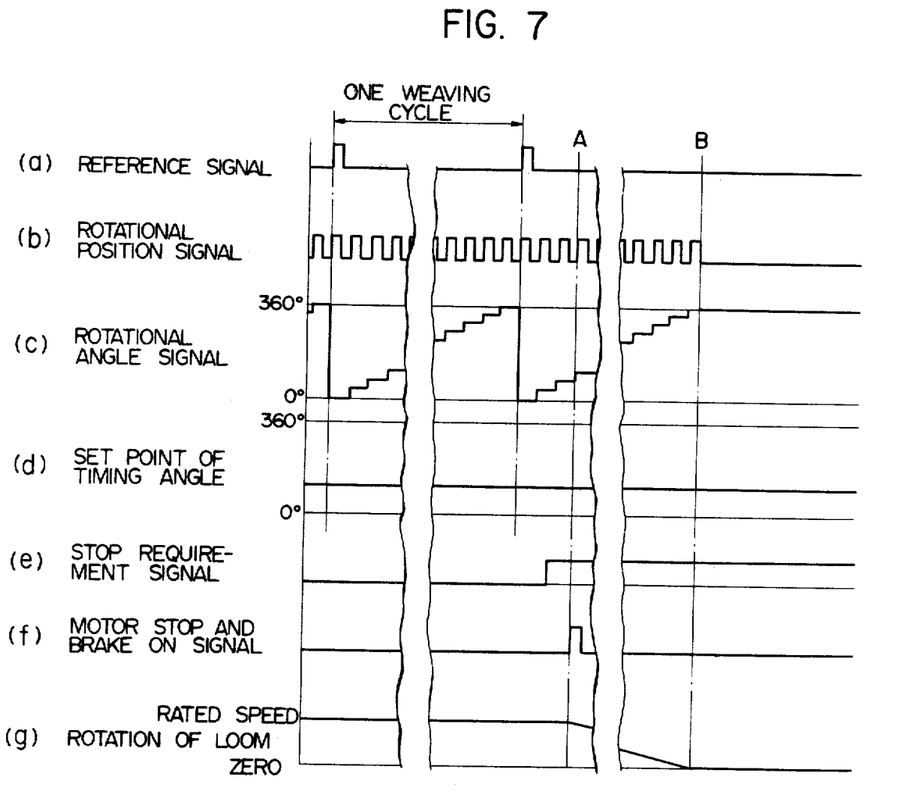
FIG. 7 is a view showing various waveforms developed in the embodiment of FIG. 1.

Referring to FIG. 1, there is shown one embodiment of a control system carrying out a control method according to the present invention, which comprises a first signal generator 1 for generating one reference signal for every one weaving cycle of the loom, a second signal generator 2 for generating a series of rotational position signal pulses, a third signal generator 3 for generating a timing angle signal, and a fourth signal generator 4 for generating a stop requirement signal, these signals being applied to a conventional controller 5 of a stored program type or a wired logic type to be processed in a manner as will be described in conjunction with FIGS. 5 to 7. The controller 5 produces a motor stop and brake on signal to discontinue energization of a motor 6 for driving the loom while at the same time putting a brake 7 on thereby to top the loom at a predetermined fixed angular position as will be described hereinafter.

The generator 3 for producing the timing angle signal may consist of a conventional digital switch, which may apply a digital signal to the controller 5 once in each weaving cycle or continuously during the operation of the loom. The timing signal produced at the beginning of the loom operation may be stored in the controller 5.

Figure 2A:
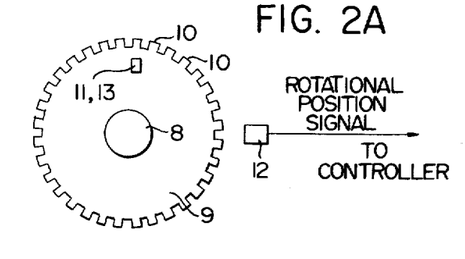
FIG. 2A is a side elevational view showing means for generating a reference signal and a rotational position signal.
Figure 2B:
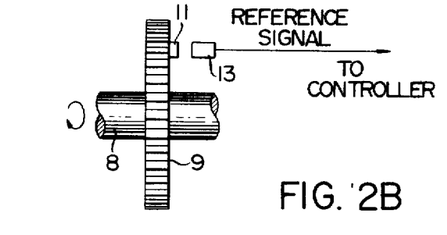
FIG. 2B is a front elevational view of the signal generating means shown in FIG. 2A.

The first and second signal generators are shown in FIGS. 2A and 2B. A movable axis 8 rotatable in synchronization with the operation of the loom has a rotary disc 9, made of magnetic material, fixedly mounted thereon. In the cylindrical periphery of the disc 9, a plurality of notches or teeth 10 are formed in an equispaced relationship to indicate a rotational position of the axis 8, i.e., the loom. Although in this example the teeth 10 provided number thirty-two, the number of teeth can be increased or decreased as desired. By increasing the number of teeth, it is possible to improve the accuracy of detection of the rotational position. On one side of the rotary disc 9, a magnet 11 is fixedly mounted in radial alignment with one of the teeth 10 to indicate a reference rotational position of the axis 8. A conventional magnetic sensor 12 is provided so as to face toward the teeth of the disc 9. When the disc 9 rotates, the sensor 12 responds to a magnetic variation, which occurs every time each tooth passes beside the sensor 12, and electrically converts the magnetic variation into a rotational position signal. In this example, 32 pulses are developed during one complete rotation of the rotary disc 9. To produce one reference signal for each complete rotation of the disc 9, a similar magnetic sensor 13 is positioned so that the magnet 11 passes beside the sensor 13 as the disc 9 rotates.

The disc 9 may be made of non-magnetic material. In this case, a number of magnetic members or magnets are attached to or embedded in the cylindrical surface of the disc in an equispaced relationship in order to produce the rotational position signal. Furthermore, the magnetic members or magnets may be attached to or embedded in only the radially outermost surfaces of the teeth 10.

Figure 3A:
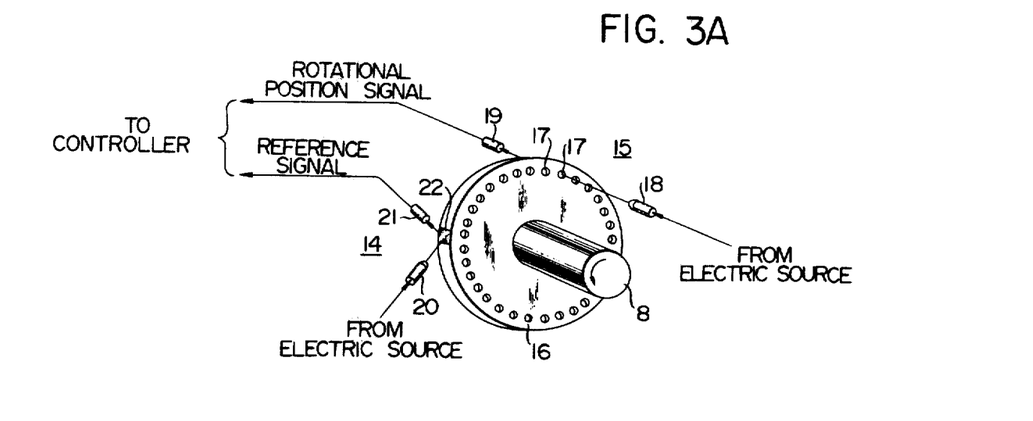
FIG. 3A is a perspective view of the signal generating means in the modified form.

FIG. 3A shows a modification of that shown in FIGS. 2A and 2B. In this modification, the reference signal and the rotational position signal are produced by conventional photoelectric sensors 14 and 15. A rotary disc 16 is mounted onto the axis 8 rotatable in synchronization with the operation of the loom. A plurality of light permeable through-holes or slits 17 (in this example, 32 holes) are axially formed in the disc 16 in an equispaced relationship to indicate rotational positions of the axis, i.e., the loom. The sensor 15 consists of a light transmitter 18 and receiver 19 positioned on opposite sides of the disc 16 so as to allow each hole 17 to pass across the path of the light emitted by the light transmitter 18 as the disc 16 rotates. Therefore, the light receiver 19 can develop 32 rotational position signal pulses during one complete rotation of the disc 16, i.e., one weaving cycle of the loom. In order to produce one reference signal for each complete rotation of the disc 16, the sensor 14 includes, in addition to a light transmitter 20 and receiver 21, a light reflectable member 22 attached to the cylindrical surface of the disc 16 so as to be in radial alignment with one of the holes 17. Therefore, when the disc 16 rotates, the light emitted from the light transmitter 20 is reflected on the light reflectable member 22 and the reflected light is received by the receiver 21 once each complete rotation of the disc 16, thus producing one reference signal for each complete rotation of the disc 16.

Figure 3B:
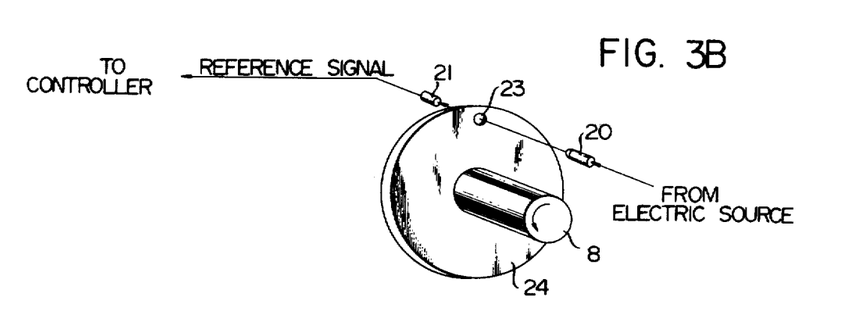
FIG. 3B is a perspective view of the reference signal generating means in another modified form.

In lieu of the light reflectable member 22, one light permeable hole or slit may be axially formed in the disc 16 at a radially outward or inward position with respect to the holes 17. Furthermore, as shown in FIG. 3B, the reference signal may be developed by receiving light passed through a light permeable hole or slit 23 axially formed in a rotary disc 24 mounted onto the axis 8 separately from the disc 16 shown in FIG. 3A, or onto another axis rotatable in synchronization with the operation of the loom. Furthermore, both the reference signal and the rotational position signal may be developed with a single light transmitter and receiver set, provided that one of the holes has a larger size than the others or spacing between one pair of the adjacent holes is narrower than that of the other pairs.

Figure 4A:
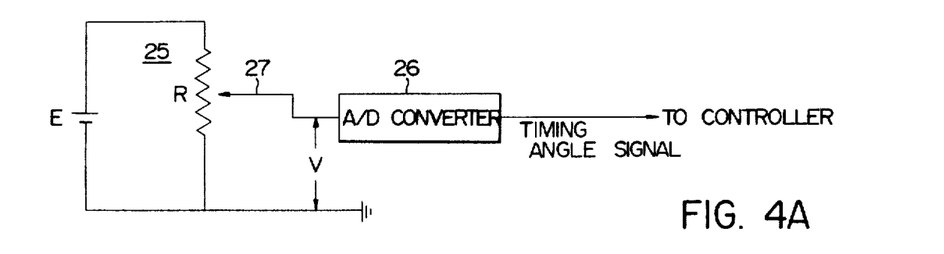
FIG. 4A is a diagrammatic view showing means for generating a timing angle signal.

FIG. 4A shows a modification of the third signal generator 3 (FIG. 1) for producing the timing angle signal, which employs a conventional potentiometer or variable-voltage supply comprising a source of electricity E and a voltage divider 25. A divided voltage V is converted into a digital timing angle signal by a conventional A/D converter 26. A range of voltages V provided by sliding a slide-wire contact 27 of the voltage divider 25 corresponds to a range of rotational angles, 0 to 360 degrees, of the loom. Therefore, the value of divided voltage V obtained by setting the contact 27 at a predetermined position indicates a timing angle, at which an operating element of the loom is to be operative.

Figure 4B:
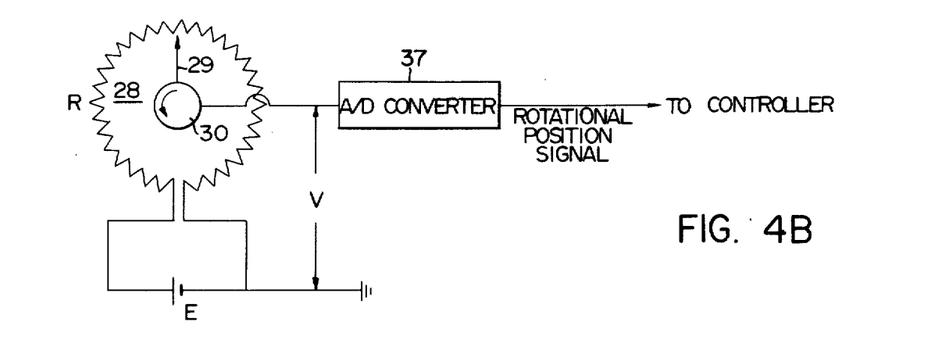
FIG. 4B is a diagrammatic view showing the rotational position signal generating means in further modified form.
Figure 4C:
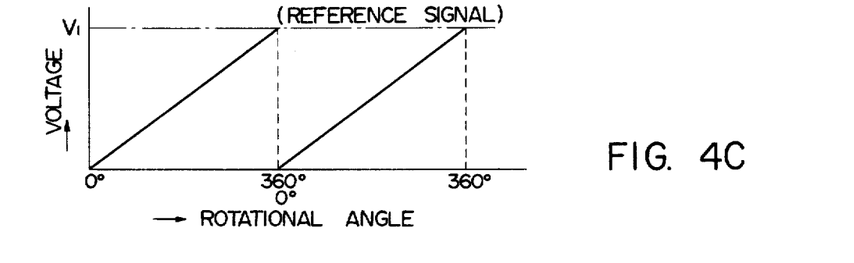
FIG. 4C is a graph showing voltage-rotational angle characteristics of the signal generating means of FIG. 4B.

FIG. 4B shows a modification of the second signal generator 2 (FIG. 1) for producing the rotational position signal, which employs a conventional rotating potentiometer or variable-voltage supply comprising a source of electricity E and a voltage divider 28. The voltage divider 28 includes a rotating contact 29 connected to an axis 30 rotating in synchronization with the operation of the loom. When the axis 30 rotates, the value of divided voltage V changes between 0 and $V_1$ every time the axis 30 makes one complete rotation as shown in FIG. 4C. Such a changing value of divided voltage V is applied to a conventional A/D converter 37 (FIG. 4B) and converted into a digital signal representing a rotational position signal.

Although not shown, a voltage across the source of electricity E is applied to a separate conventional A/D converter to develop a reference digital signal, of which a value corresponds for example to the voltage $V_1$.

The reference, rotational position, timing angle and stop requirement signals developed in each embodiment shown in FIGS. 1, 2A, 2B, 3A and 3B are applied to the controller 5 as stated above.

As understood from FIGS. 1 and 5 to 7, when one reference signal is inputted through an input interface 31 in a central processing unit (CPU) of the controller 5, the CPU begins to count the number of rotational position signal pulses and develops the step-up rotational angle signal in a digital form as shown by waveform (c) in FIG. 7. This rotational angle digit signal indicates the angle through which the loom has been rotated with respect to the reference position providing the reference signal. Then, the rotational angle signal is compared with a set point of timing angle given by the timing angle signal as shown by waveform (d) in FIG. 7. When it is necessary to stop the operation of the loom, the stop requirement signal (waveform (e) in FIG. 7) is produced by the fourth signal generator 4, which is, for example, a switch for controlling operation of the loom, and temporarily stored or latched in a random access memory (RAM) 33 of the controller. In the meantime, the digitally represented signal of the angle for which the loom has been rotated with respect to the reference point, i.e., the digital value of the rotational angle signal, becomes equal to the set point of the timing angle. At that time shown by the letter "A" in FIG. 7, if the stop requirement signal has been developed, a motor stop and brake on signal will be produced as shown by waveform (f) in FIG. 7 through an output interface 34 of the controller 5 thereby stopping the operation of the loom at the predetermined fixed position shown at time "B" in FIG. 7. Therefore, it is understood that according to the present invention, a time delay in initiating the stopping operation of the loom after the occurrence of the stop requirement can be minimized. In FIG. 5, reference numerals 35 and 36 respectively represent a read only memory and a timing clock, both of which operate in a known manner.

In the case of the embodiment using the potentiometers shown in FIGS. 4A and 4B, the reference signal and the rotational position signal are applied to the controller 5, where the digital value of the rotational position signal is compared with that of the reference signal and converted to the rotational angle signal representing the angle for which the loom has been rotated with respect to the reference point. The subsequent processings can be performed in the same manner as that described with reference to FIGS. 1, 2A, 2B, 3A and 3B. If the voltage of the electricity source E is known and stable, its digital value may be stored in the controller 5 and read out when compared with the rotational angle signal.

Figure 8:
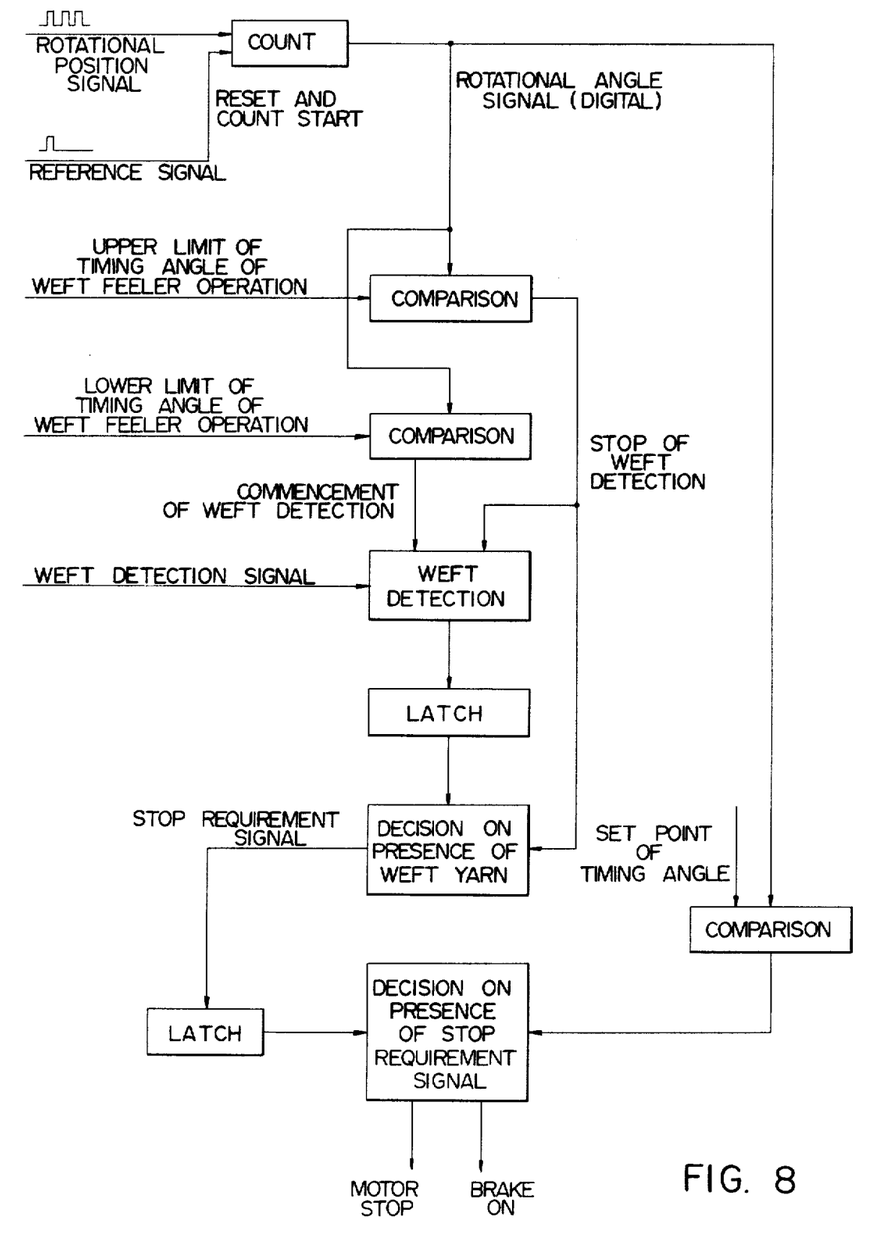
FIG. 8 is a view, corresponding to FIG. 6, explaining operation of another embodiment according to the invention.
Figure 9:
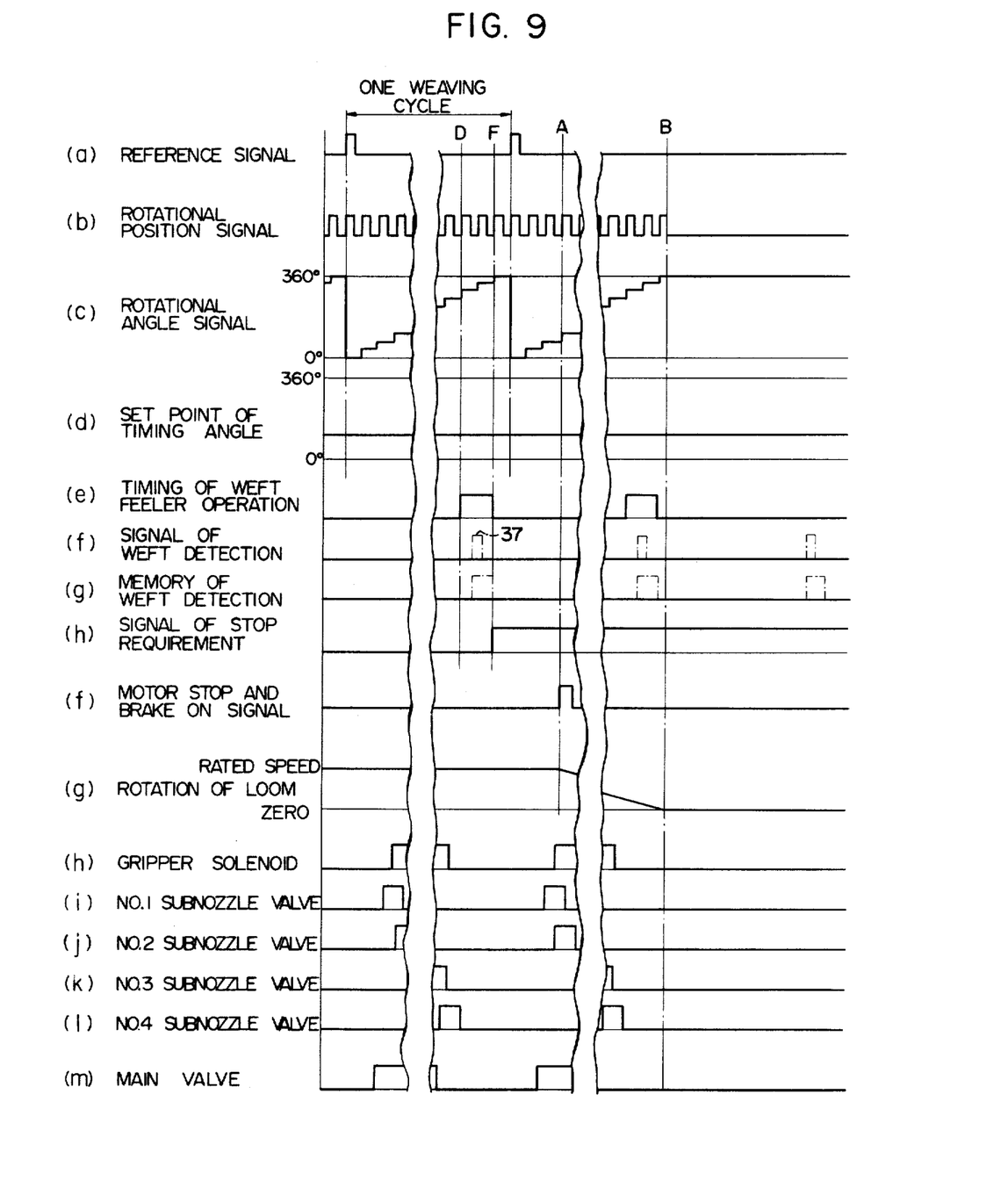
FIG. 9 is a view showing various waveforms developed in another embodiment, of which operation is illustrated in FIG. 8.

FIGS. 8 and 9 show another embodiment of this invention, wherein the timing of operation of a weft yarn feeler is adapted to be controlled by utilizing the same controller as that shown in FIG. 5 and a stop requirement signal is produced from the weft yarn feeler when it detects an absence of a weft yarn.

In FIGS. 8 and 9, by comparing the rotational position signal with the reference signal, the rotational angle signal is produced as in the previous embodiment. Since the weft yarn feeler must be operative for a predetermined period of time during each weaving cycle of the loom, an upper and a lower limit of the timing angle of the weft feeler operation are programmed and stored in the read only memory (ROM) 35 as shown by waveform (e) in FIG. 9. The CPU 32 compares the rotational angle signals with the upper and lower limits of the programmed timing angle of the weft yarn feeler and allows the weft yarn feeler to operate for only the period of time between time points D and F at which the rotational angle signals equal said upper and lower limits. An output of the weft yarn feeler is applied through the input interface 31 to the CPU 32. If the weft yarn feeler detects the presence of the weft yarn, the output thereof will be in the form of a pulse 37 shown by the dotted line in FIG. 9 (waveform (f)) and stored in the RAM 33 until the time point F as shown by waveform (g) in FIG. 9, thus allowing the loom to continue the subsequent weaving cycles. However, when the weft yarn feeler detects the absence of the weft yarn, the stop requirement signal will be produced at the time point F and stored in the RAM 33.

In the meantime, in the CPU 32, the rotational angle signal is always compared with the set point of the timing angle for the stop of the loom shown by waveform (d) in FIG. 9. When the rotational angle signal becomes equal to the set point of the timing angle at the time point A, the motor stop and brake on signal will be developed through the output interface 34, provided that the stop requirement signal has been issued prior to the time point A. Therefore, the brake is put on and the loom is stopped at the predetermined fixed position shown at B.

In the embodiment shown in FIGS. 8 and 9, the upper and lower limits of the timing angle of the weft feeler operation may be provided by a digital switch and/or a potentiometer as employed in the previous embodiment.

Although, in the afore-mentioned embodiments, the stop requirement signal is developed by the weft yarn feeler or the switch for controlling the loom operation, it may be issued by a switch for operating the loom at a low speed, or a feeler for detecting a warp yarn, cloth selvage yarn or waste selvage yarn.

Furthermore, the present invention is applicable to the control of all operating elements of the loom, which should be operated in a timed relationship with the rotation of the loom, such as an electric motor for driving a warp supply roller, an electric motor for driving a cloth taking up roller, a gripper solenoid for energizing a gripper to grip the trailing end of an weft yarn after the weft yarn has been inserted into a shed, and various solenoid valves associated with fluid supply nozzles, which are operated in sequence to cause the weft yarn to be inserted into the shed by fluid flows therefrom. Waveforms (h) to (m) in FIG. 9 show the timing of the operation of the gripper solenoid and fluid nozzle solenoid valves.

Although the specific embodiments have been described above, it will be readily understood by those skilled in the art that various modifications may be accomplished without departing from the spirit and scope of the invention as defined in the appended claims. For example, instead of the rotary disc 9 or 14 shown in FIG. 2A or 3A, an oscillating or reciprocating member may be employed to produce the reference signal and rotational position signal.

What we claim is:

1. A method for controlling operation of at least one operating element of a loom on the basis of a reference signal, characterized in that the reference signal is compared with rotational position signal developed during each weaving cycle of the loom to issue a rotational angle signal indicating an angle through which the loom has been rotated with respect to a reference angular position, and that the timing of the operation of the operating element is determined by utilizing the rotational angle signal.

2. The method as set forth in claim 1, characterized in that the timing of the operation of the operating element is determined by comparing the rotational angle signal with a preset value of a timing angle at which the operating element is to be operated.

3. A system for controlling operation of at least one operating element of a loom, comprising a first means for generating a reference signal indicating a reference angular position of the loom during one weaving cycle of the loom, a second means for generating a rotational position signal indicating angular positions of the loom at successive points of time during one weaving cycle of the loom, and a controller for comparing the rotational position signal with the reference signal to issue a rotational angle signal indicating an angle through which the loom has been rotated with respect to the reference angular position thereof and on the basis of which the timing of the operation of the operating element is determined.

4. The system as set forth in claim 3, wherein the controller includes means for comparing the angle indicated by the rotational angle signal with at least one preset value of a timing angle, at which the operating element is to be operated, thereby determining the timing of the operation of the operating element.

5. A system for controlling operation of at least one operating element of a loom, comprising a first means for generating a reference signal indicating a reference angular position of the loom during one weaving cycle of the loom, a second means for generating a rotational position signal indicating angular positions of the loom at successive points of time during one weaving cycle of the loom, and a controller for comparing the rotational position signal with the reference signal to issue a rotational angle signal indicating an angle through which the loom has been rotated with respect to the reference angular position thereof and on the basis of which the timing of the operation of the operating element is determined;

wherein the controller includes means for comparing the angle indicated by the rotational angle signal with at least one preset value of a timing angle, at which the operating element is to be operated, thereby determining the timing of the operation of the operating element;

further comprising means associated with the controller for generating and applying a stop requirement signal thereto, and wherein the controller includes a memory for storing the applied stop requirement signal until said angle indicated by the rotational angle signal becomes equal to said preset value of the timing angle, whereupon a signal for causing the operating element to be operated is issued.

6. The system as set forth in claim 5, wherein the stop requirement signal generating means is a switch for stopping the operation of the loom and the operating element is a brake for the loom.

7. The system as set forth in claim 4, wherein the operating elements are a weft yarn detector and a brake for the loom, and the preset values are upper and lower limits of the timing angle of the weft yarn detector and the timing angle of the brake, and the controller includes a memory for storing a stop requirement signal, which will be issued if the weft yarn detector detects an absence of the weft yarn during its operation caused when said angle indicated by the rotational angle signal becomes equal to the preset values of the upper and lower limits of the timing angle of the weft yarn detector, until said angle indicated by the rotational angle signal becomes equal to the preset value of the timing angle of the brake.

8. A system for controlling operation of at least one operating element of a loom, comprising a first means for generating a reference signal indicating a reference angular position of the loom during one weaving cycle of the loom, a second means for generating a rotational position signal indicating angular positions of the loom at successive points of time during one weaving cycle of the loom, and a controller for comparing the rotational position signal with the reference signal to issue a rotational angle signal indicating an angle through which the loom has been rotated with respect to the reference angular position thereof and on the basis of which the timing of the operation of the operating element is determined;

wherein the controller includes means for comparing the angle indicated by the rotational angle signal with at least one preset value of a timing angle, at which the operating element is to be operated, thereby determining the timing of the operation of the operating element;

and wherein the first signal generating means comprises a magnet mounted on one side surface of a circular disc rotatable in synchronization with the operation of the loom, and a magnetic sensor disposed near the magnet for sensing a magnetic variation to convert the magnetic variation to the reference signal as the disc rotates, and the second signal generating means comprises a magnetic sensor provided opposite to the cylindrical surface of the disc, and a plurality of magnetic segments or magnets provided on the cylindrical surface of the disc in a circumferentially equispaced relationship with one of the magnetic segments or magnets in radial alignment with the magnet of the first signal generating means, the magnetic sensor of the second signal generating means sensing a magnetic variation to convert it to the rotational position signal as the disc rotates.

9. A system for controlling operation of at least one operating element of a loom, comprising a first means for generating a reference signal indicating a reference angular position of the loom during one weaving cycle of the loom, a second means for generating a rotational position signal indicating angular positions of the loom at successive points of time during one weaving cycle of the loom, and a controller for comparing the rotational position signal with the reference signal to issue a rotational angle signal indicating an angle through which the loom has been rotated with respect to the reference angular position thereof and on the basis of which the timing of the operation of the operating element is determined;

wherein the controller includes means for comparing the angle indicated by the rotational angle signal with at least one preset value of a timing angle, at which the operating element is to be operated, thereby determining the timing of the operation of the operating element;

and wherein the first signal generating means comprises a set of a light transmitter and receiver disposed relatively adjacent a circular disc rotatable in synchronization with the operation of the loom, and a single means structurally associated with the disc for permitting a light beam from the light transmitter to reach the light receiver, thereby developing the reference signal, and the second signal generating means comprises a set of a light transmitter and receiver disposed on the opposite sides of the disc, and a plurality of light permeable holes or slits provided in the disc in an equispaced relationship so that each hole or slit passes across the path of the light from the transmitter to the receiver as the disc rotates, thereby developing the rotational position signal.

10. A system for controlling operation of at least one operating element of a loom, comprising a first means for generating a reference signal indicating a reference angular position of the loom during one weaving cycle of the loom, a second means for generating a rotational position signal indicating angular positions of the loom at successive points of time during one weaving cycle of the loom, and a controller for comparing the rotational position signal with the reference signal to issue a rotational angle signal indicating an angle through which the loom has been rotated with respect to the reference angular position thereof and on the basis of which the timing of the operation of the operating element is determined;

wherein the controller includes means for comparing the angle indicated by the rotational angle signal with at least one preset value of a timing angle, at which the operating element is to be operated, thereby determining the timing of the operation of the operating element;

and wherein the first signal generating means comprises an A/D converter for converting a voltage from a source of electricity to a digital value, and the second signal generating means comprises a rotating potentiometer including a voltage divider, of which a slide-wire contact is rotatable in synchronization with the operation of the loom, and an A/D converter for converting a divided voltage from the voltage divider to a digital signal representative of the rotational position signal.

11. A system for controlling operation of at least one operating element of a loom, comprising a first means for generating a reference signal indicating a reference angular position of the loom during one weaving cycle of the loom, a second means for generating a rotational position signal indicating angular positions of the loom at successive points of time during one weaving cycle of the loom, and a controller for comparing the rotational position signal with the reference signal to issue a rotational angle signal indicating an angle through which the loom has been rotated with respect to the reference angular position thereof and on the basis of which the timing of the operation of the operating element is determined;

wherein the controller is a stored program type computer.

12. A system for controlling operation of at least one operating element of a loom, comprising a first means for generating a reference signal indicating a reference angular position of the loom during one weaving cycle of the loom, a second means for generating a rotational position signal indicating angular positions of the loom at successive points of time during one weaving cycle of the loom, and a controller for comparing the rotational position signal with the reference signal to issue a rotational angle signal indicating an angle through which the loom has been rotated with respect to the reference angular position thereof and on the basis of which the timing of the operation of the operating element is determined;

wherein the controller is of a wired logic type.

13. A system for controlling operation of at least one operating element of a loom, comprising a first means for generating a reference signal indicating a reference angular position of the loom during one weaving cycle of the loom, a second means for generating a rotational position signal indicating angular positions of the loom at successive points of time during one weaving cycle of the loom, and a controller for comparing the rotational position signal with the reference signal to issue a rotational angle signal indicating an angle through which the loom has been rotated with respect to the reference angular position thereof and on the basis of which the timing of the operation of the operating element is determined;

wherein the controller includes means for comparing the angle indicated by the rotational angle signal with at least one preset value of a timing angle, at which the operating element is to be operated, thereby determining the timing of the operation of the operating element;

and wherein the controller is a stored program type computer.

14. A system for controlling operation of at least one operating element of a loom, comprising a first means for generating a reference signal indicating a reference angular position of the loom during one weaving cycle of the loom, a second means for generating a rotational position signal indicating angular positions of the loom at successive points of time during one weaving cycle of the loom, and a controller for comparing the rotational position signal with the reference signal to issue a rotational angle signal indicating an angle through which the loom has been rotated with respect to the reference angular position thereof and on the basis of which the timing of the operation of the operating element is determined;

wherein the controller includes means for comparing the angle indicated by the rotational angle signal with at least one preset value of a timing angle, at which the operating element is to be operated, thereby determining the timing of the operation of the operating element;

and wherein the controller is of a wired logic type.

15. The system as set forth in claims 5 or 6 or 8 or 9 or 10, wherein the controller is a stored program type computer.

16. The system as set forth in claims 5 or 6 or 8 or 9 or 10, wherein the controller is of a wired logic type.

17. The system as set forth in claims 3 or 4, wherein the controller is a stored program type computer.

18. The system as set forth in claims 3 or 4, wherein the controller is of a wired logic type.

* * * * *